(12) United States Patent
Kuo

(10) Patent No.: US 7,470,053 B2
(45) Date of Patent: Dec. 30, 2008

(54) BACK LIGHT MODULE HAVING CONCAVE-DOWN LUMINANCE DISTRIBUTION

(75) Inventor: Shih-Yuan Kuo, Taipei Hsien (TW)

(73) Assignee: Lite-On Technology Corp., Neihu, Taipei (TW)

( * ) Notice: Subject to any disclaimer, the term of this patent is extended or adjusted under 35 U.S.C. 154(b) by 250 days.

(21) Appl. No.: 11/161,047

(22) Filed: Jul. 20, 2005

(65) Prior Publication Data

US 2006/0221640 A1    Oct. 5, 2006

(30) Foreign Application Priority Data

Apr. 1, 2005    (TW) ............................... 94110454 A

(51) Int. Cl.
*F21V 7/04*    (2006.01)
(52) U.S. Cl. .................. 362/617; 362/561; 349/65; 385/132

(58) Field of Classification Search ................. 362/560, 362/561, 330, 555, 614, 617, 619; 349/65; 385/129–132
See application file for complete search history.

(56) References Cited

U.S. PATENT DOCUMENTS

| 6,108,060 | A  | * | 8/2000  | Funamoto et al. | ............. 349/65  |
| 7,165,874 | B2 | * | 1/2007  | Nagakubo et al. | ........... 362/623 |
| 7,172,327 | B2 | * | 2/2007  | Kuo             | ........... 362/609 |
| 7,290,921 | B2 | * | 11/2007 | Lin             | ........... 362/625 |

FOREIGN PATENT DOCUMENTS

| CN | 1499263 A | 5/2004 |
| CN | 2627536 Y | 7/2004 |
| CN | 1538216 A | 10/2004 |

* cited by examiner

*Primary Examiner*—John A Ward
(74) *Attorney, Agent, or Firm*—Winston Hsu

(57) ABSTRACT

Several optical mechanism designs for making luminance of the outer portion of a back light module of edge lighting type to become higher than luminance of the inner portion of the back light module are disclosed in accordance with the present invention. The disclosed optical mechanism designs can cooperate with each other to enhance the optical effect of the back light module. Additionally, the back light modules of the present invention are feasible for use in various scanners or liquid crystal displays.

25 Claims, 6 Drawing Sheets

BACK LIGHT MODULE HAVING CONCAVE-DOWN LUMINANCE DISTRIBUTION

BACKGROUND OF THE INVENTION

1. Field of the Invention

The present invention relates to back light modules, and more particularly, to back light modules whose outer portion has higher luminance than inner portion thereof.

2. Description of the Prior Art

A back light module is one of the key components for the liquid crystal display (LCD) or the scanner. The back light module comprises light sources and other optical devices for reflecting or refracting light to provide uniform light output. The light source of the back light module is typically a cold cathode fluorescent lamp (CCFL) or light emitting diode (LED). In general, the back light module can be divided into two groups, the edge lighting type and the direct lighting type. The two groups are categorized by the positions of the light sources thereof.

In the conventional art, the main concept of designing both the edge lighting type and the direct lighting type is to provide a uniform light output from the back light module, i.e., to uniform the luminance distribution of the back light module. Unfortunately, such a design concept may negatively affect the performance of some applications.

For example, suppose that a conventional back light module having uniform luminance distribution is employed in a scanner as a back light source required for scanning transparencies, and positive or negative films. The brightness of the outer portion of a scanned image received by an optical module of the scanner is usually lower than the brightness of the inner portion of the scanned image due to the optical characteristics or mechanical designs of the optical module, and thereby reducing the scanning quality of the scanner.

SUMMARY OF THE INVENTION

An exemplary embodiment of a back light module of edge lighting type is disclosed comprising: a light guide plate (LGP) for scattering incident light to a light output surface; a diffuser positioned on the light output surface of the light guide plate for diffusing light from the light output surface; a reflecting layer positioned on a reflection surface of the light guide plate for reflecting light into the light guide plate; and a light emitting device for emitting light to at least one side of the light guide plate, wherein the outer portion of the light emitting device along a first axis having higher luminous intensity than the inner portion thereof.

Another exemplary embodiment of a back light module of edge lighting type is disclosed comprising: a light emitting device for emitting light; a light guide plate (LGP) for scattering light from the light emitting device to a light output surface, wherein a plurality of reflection patterns (or referred to as reflection elements) being formed on a reflection surface of the light guide plate so that the outer portion of the light guide plate has higher luminance than the inner portion of the light guide plate; a diffuser positioned on the light output surface of the light guide plate for diffusing light from the light output surface; and a reflecting layer positioned on the reflection surface of the light guide plate for reflecting light into the light guide plate.

Another exemplary embodiment of a back light module of edge lighting type is disclosed comprising: a light emitting device for emitting light; a light guide plate (LGP) for scattering light from the light emitting device to a light output surface; a diffuser positioned on the light output surface of the light guide plate for diffusing light from the light output surface, wherein the outer portion of the diffuser has higher light transmittance than the inner portion of the diffuser; and a reflecting layer positioned on a reflection surface of the light guide plate for reflecting light into the light guide plate.

Another exemplary embodiment of a back light module of edge lighting type is disclosed comprising: a light guide plate (LGP) for scattering incident light to a light output surface; a diffuser positioned on the light output surface of the light guide plate for diffusing light from the light output surface; a reflecting layer positioned on a reflection surface of the light guide plate for reflecting light into the light guide plate; a light emitting device for emitting light to the light guide plate; and a reflector positioned on a side of the light emitting device such that the light emitting device being disposed between the reflector and the light guide plate, the reflector for reflecting light from the light emitting device to the light guide plate; wherein the outer portion of the reflector has higher reflectivity or larger reflecting area than the inner portion of the reflector.

Thereto, another exemplary embodiment of a back light module of edge lighting type is disclosed comprising: a light guide plate (LGP) for scattering incident light to a light output surface; a diffuser positioned on the light output surface of the light guide plate for diffusing light from the light output surface; a reflecting layer positioned on a reflection surface of the light guide plate for reflecting light into the light guide plate; a light emitting device for emitting light to the light guide plate; and two reflectors positioned on a side of the light emitting device with each corresponding to one of two ends of the light emitting device such that the light emitting device being disposed between the two reflectors and the light guide plate, the two reflectors for reflecting light emitted from the two ends of the light emitting device to the light guide plate.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
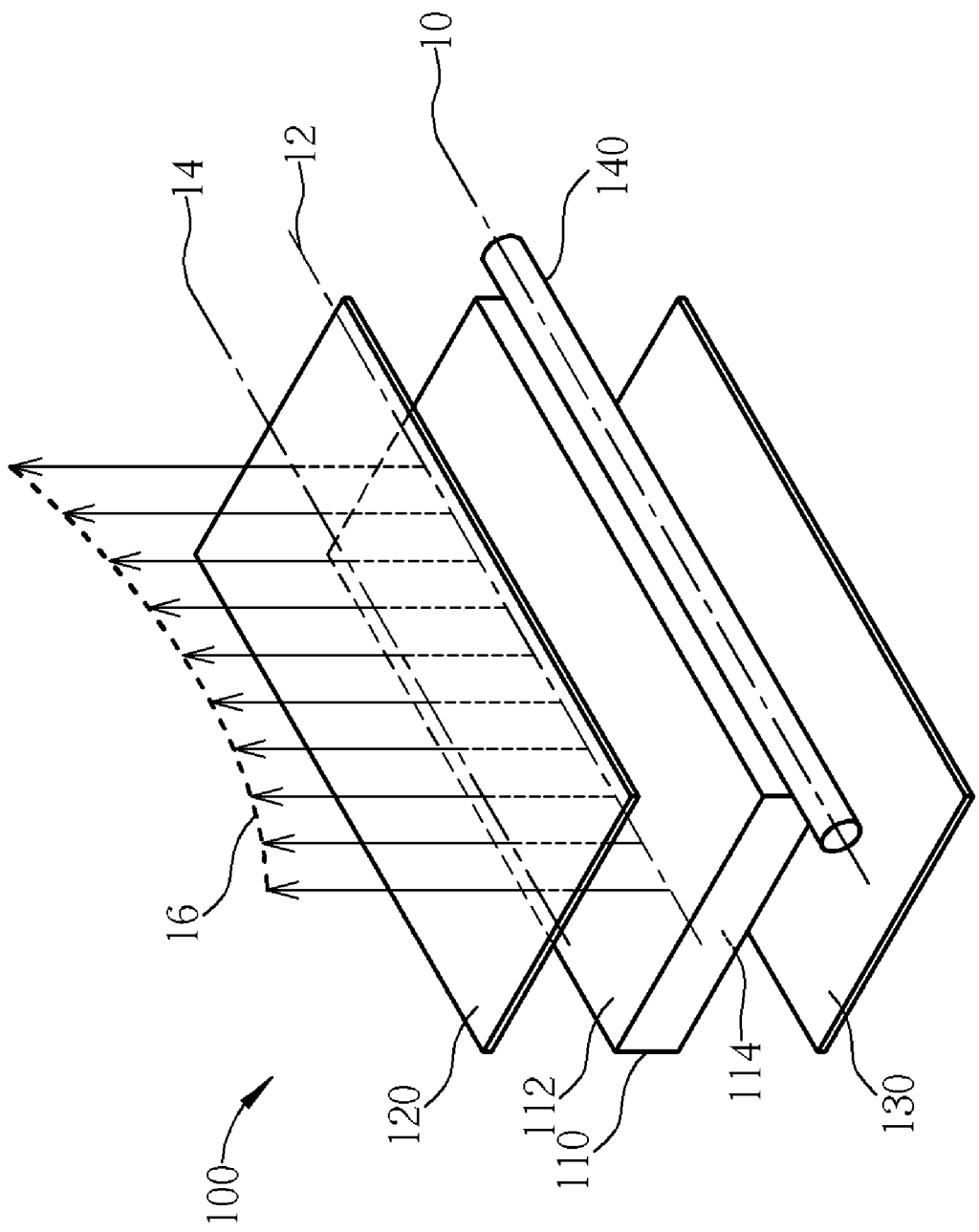
FIG. 1 is a simplified diagram of a back light module of the edge lighting type according to one embodiment of the present invention.

Please refer to FIG. 1, which shows a simplified diagram of a back light module 100 of the edge lighting type according to one embodiment of the present invention. As shown, the back light module 100 comprises a light guide plate (LGP) 110; a diffuser 120 position on a light output surface 112 of the LGP 110; a reflecting layer 130 positioned on a reflection surface 114 of the LGP 110; and a light emitting device 140 for emitting light to at least one side of the LGP 110. The LGP 110 is arranged for scattering and guiding incident light to the light output surface 112. Then, the diffuser 120 diffuses light from the light output surface 112. The reflecting layer 130 is utilized for reflecting light into the LGP 110 to increase the light usage efficiency. The LGP 110 is generally made by acrylic resin, but this is not a restriction of the practical applications. Additionally, the LGP 110 can be planar or wedge-shaped.

Figure 2:
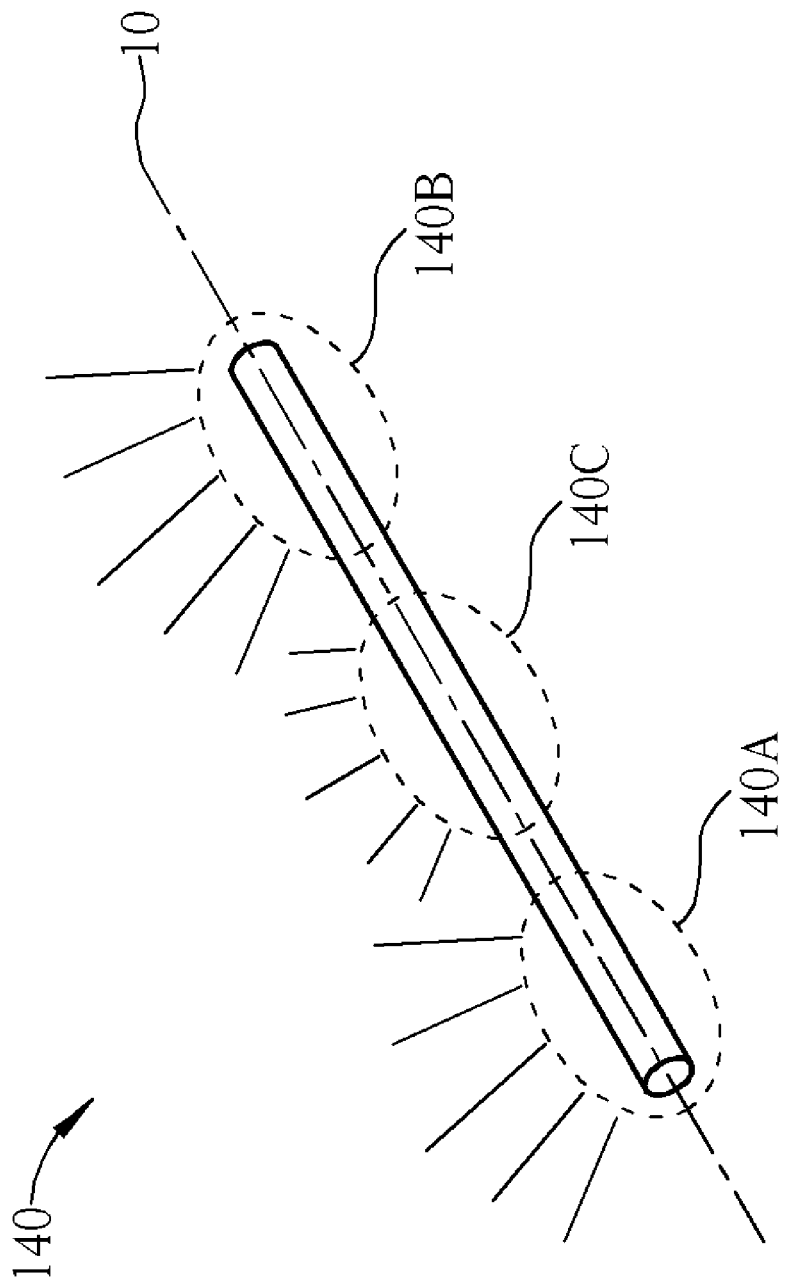
FIG. 2 is a schematic diagram illustrating a luminous intensity distribution of a light emitting device of FIG. 1 according to one embodiment of the present invention.

FIG. 2 illustrates a luminous intensity distribution of the light emitting device 140 according to one embodiment of the present invention. As shown, in this embodiment, the outer portion 140A and 140B of the light emitting device 140 along a first axis 10 have higher luminous intensity than the inner portion 140C of the light emitting device 140. This configuration results in the two ends of the LGP 110 receiving more light than the middle portion (i.e., the inner portion) of the LGP 110. As a result, the luminance of the outer portion of the LGP 110 along a second axis 12 is higher than the luminance of the inner portion thereof, i.e., the LGP 110 has a concave-down luminance distribution. Preferably, the LGP 110 has an arc-shaped luminance distribution such as a curve 16 shown in FIG. 1.

Figure 3:
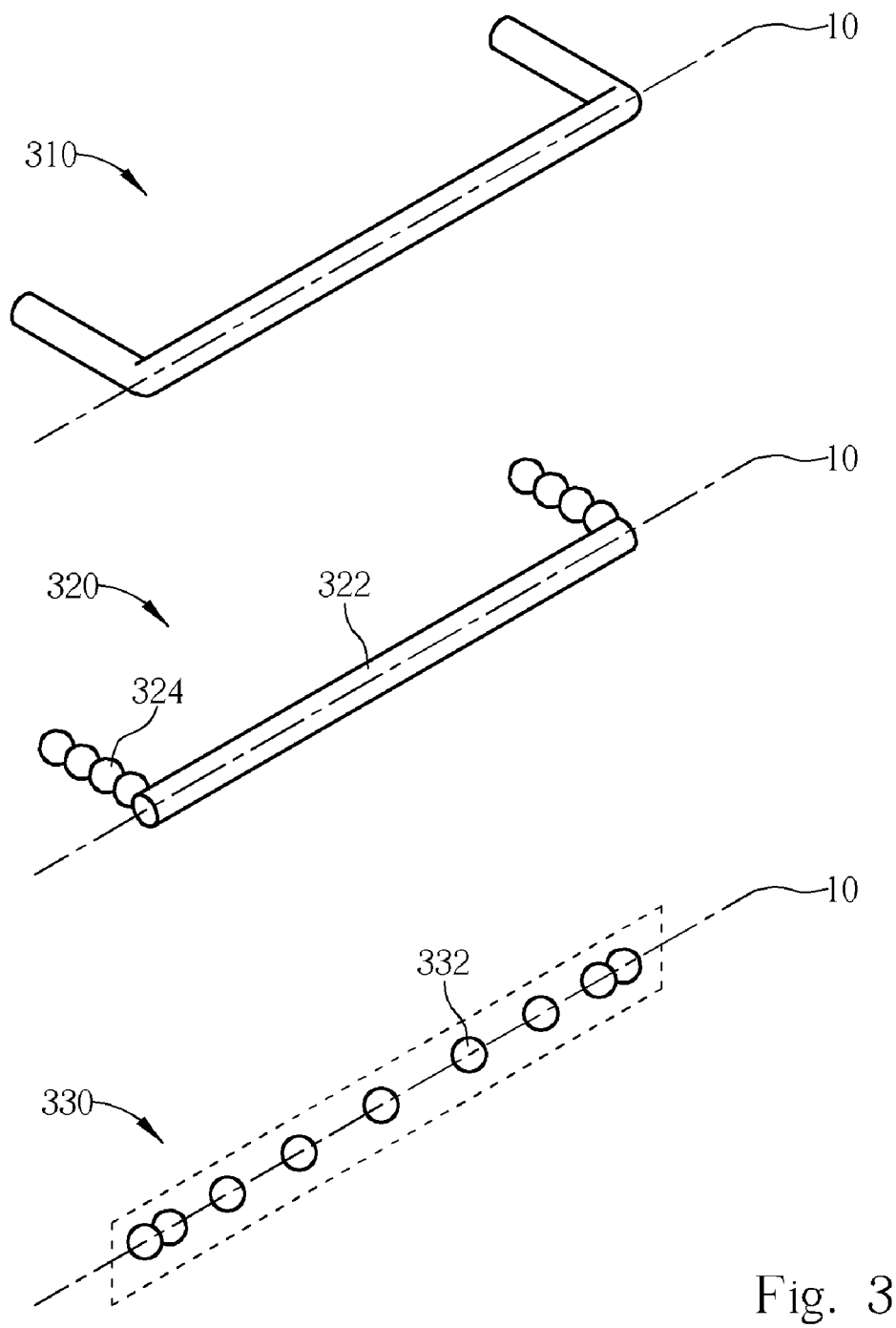
FIG. 3 is a diagram showing different embodiments of the light emitting device of FIG. 1 in accordance with the present invention.

FIG. 3 shows three different embodiments of the light emitting device 140 in accordance with the present invention. In implementations, the light emitting device 140 may be a lamp having a bent shape such as a U-shaped lamp 310 shown in FIG. 3. The U-shaped lamp 310 can be implemented with a cold cathode fluorescent lamp (CCFL). A light emitting device 320 shown in FIG. 3 is an alternative embodiment. As shown, the light emitting device 320 comprises a straight lamp 332(e.g., a straight CCFL) and a plurality of luminance units 324 for enhancing the luminous intensity of the outer portion of the light emitting device 320. The plurality of luminance units 324 can be a plurality of electro luminances (ELs), a plurality of light emitting diodes (LEDs), or a combination of the two. A light emitting device 330 shown in FIG. 3 is another embodiment. The light emitting device 330 is composed of a plurality of luminance units 332. Similarly, the plurality of luminance units 332 can be a plurality of ELs, a plurality of LEDs, or a combination of the two. It can be appreciated by those of ordinary skill in the art that the luminous intensity of the outer portion of the light emitting device 330 along the axis 10 can become higher than the inner portion of the light emitting device 330 by properly adjusting the arrangement density (i.e., spacing) of the plurality of luminance units 332.

Please note that the light emitting device 140 can also be implemented with other design choices. In addition, the number of light emitting devices employed in the back light module 100 is not a restriction of the present invention, i.e., two, or more than two, sets of light emitting devices may be employed as the light source in the back light module 100.

In the previous embodiment, the back light module 100 enhances the luminance of the outer portion thereof (or the outer portion of the LGP 110) by utilizing the light emitting device 140 whose outer portion has higher luminous intensity than the inner portion. In practice, the back light module 100 can obtain the same optical characteristic by adopting other optical mechanisms.

For example, a plurality of reflection patterns (or referred to as reflection elements) are typically formed on the reflection surface 114 of the LGP 110 for destroying total reflection of light so that the incident light can be guided to the light output surface 112. The reflection patterns/elements formed on the reflection surface 114 of the LGP 110 can be properly designed such that the outer portion of the LGP 110 has higher luminance than the inner portion thereof. Further details will be explained with reference to FIG. 4.

Figure 4:
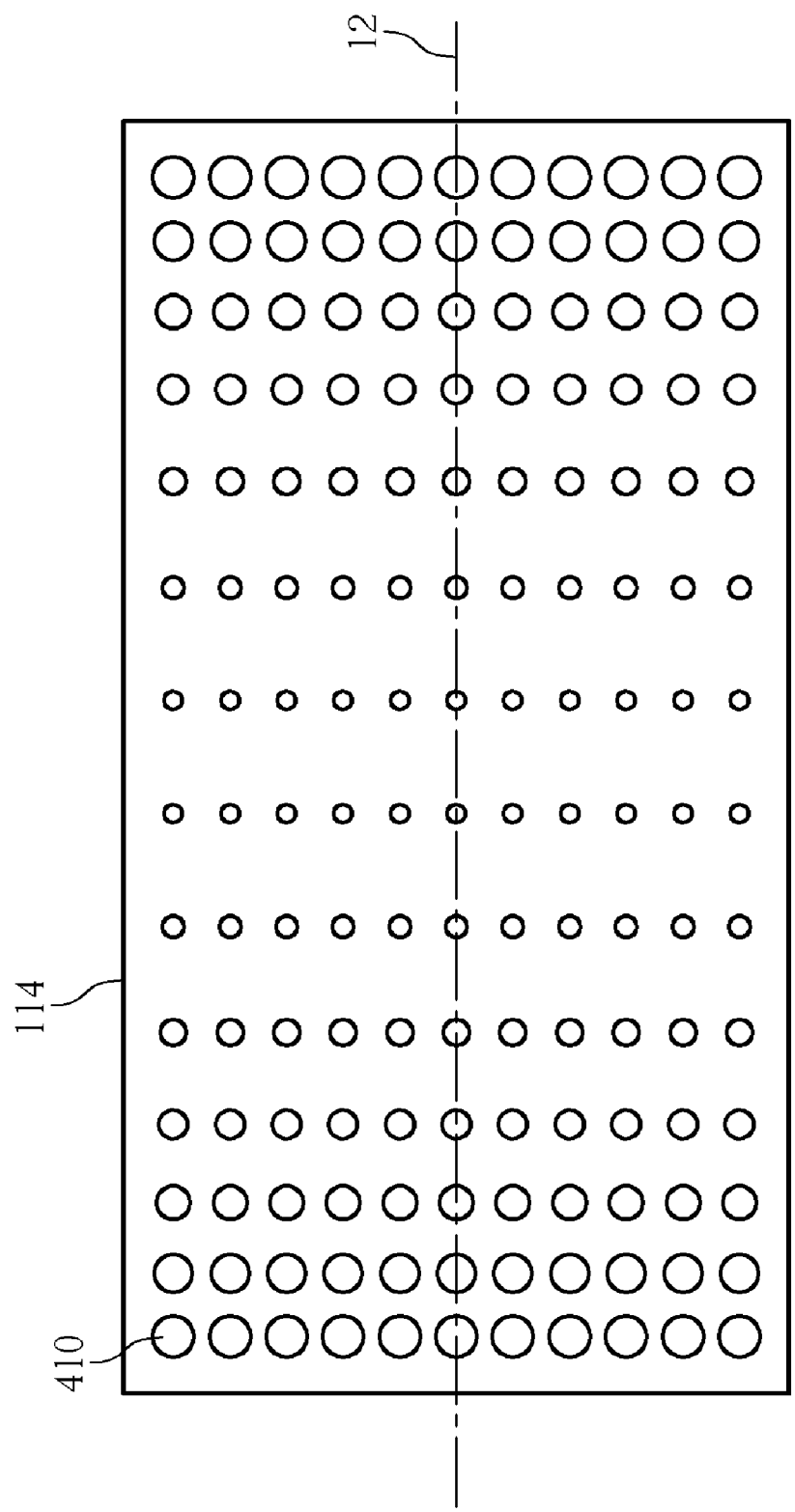
FIG. 4 is a diagram showing reflection patterns/elements on a light guide plate of FIG. 1 according to one embodiment of the present invention.

FIG. 4 shows a diagram showing reflection patterns/elements on the reflection surface 114 of the LGP 110 according to one embodiment of the present invention. In this embodiment, the reflection patterns/elements on the reflection surface 114 of the LGP 110 is a plurality of reflector dots 410 printed on the reflection surface 114. The plurality of reflector dots 410 has variety in size and arrangement density (or spacing). As shown in FIG. 4, the outer portion of the reflection surface 114 along the axis 12 has larger reflector dots than the inner portion and has higher arrangement density of reflector dots than the inner portion. This configuration results in the outer portion of the LGP 110 has higher luminance than the inner portion of the LGP 110.

Instead of the printed reflection dots, the reflection patterns/elements formed on the reflection surface 114 of the LGP 110 may be a plurality of microstructures such as micro-lens or v-cut grooves. Similarly, the luminance of the outer portion of the LGP 110 can become higher than that of the inner portion by properly arranging these microstructures. The method of creating micro-lens or v-cut grooves on the reflection surface 114 is well known in the art and further details are therefore omitted for brevity.

In addition, the luminance distribution of the back light module 100 can be adjusted by modifying the design of the diffuser 120. For example, in one embodiment, the diffuser 120 of the back light module 100 has non-uniform light transmittance distribution. Specifically, the diffuser 120 of this embodiment is purposefully designed such that the light transmittance of the outer portion of the diffuser 120 along a third axis 14 is better than that of the inner portion thereof. As a result, the back light module 100 can obtain the same optical characteristic as the foregoing embodiments, i.e., the luminance of the outer portion of the back light module 100 along the second axis 12 (or the third axis 14) will be higher than the luminance of the inner portion.

Figure 5:
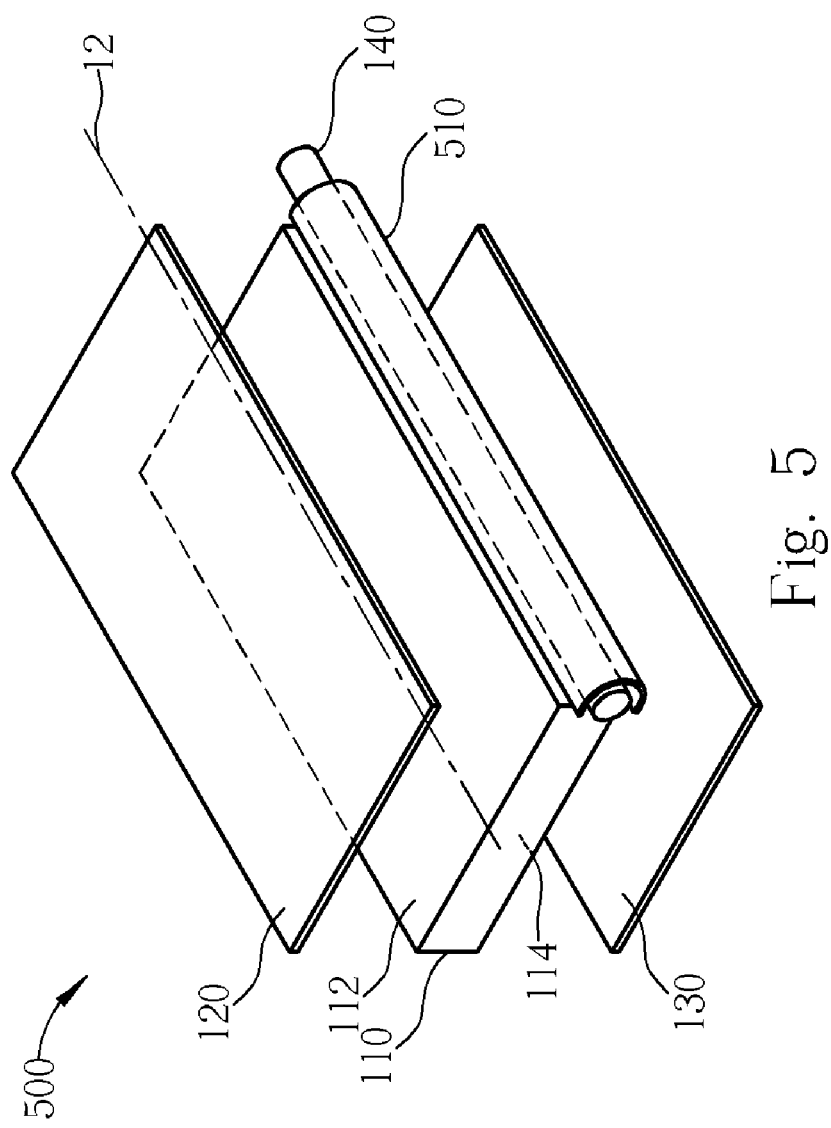
FIG. 5 and FIG. 6 are other embodiments of the back light module of the edge lighting type in accordance with the present invention.
Figure 6:
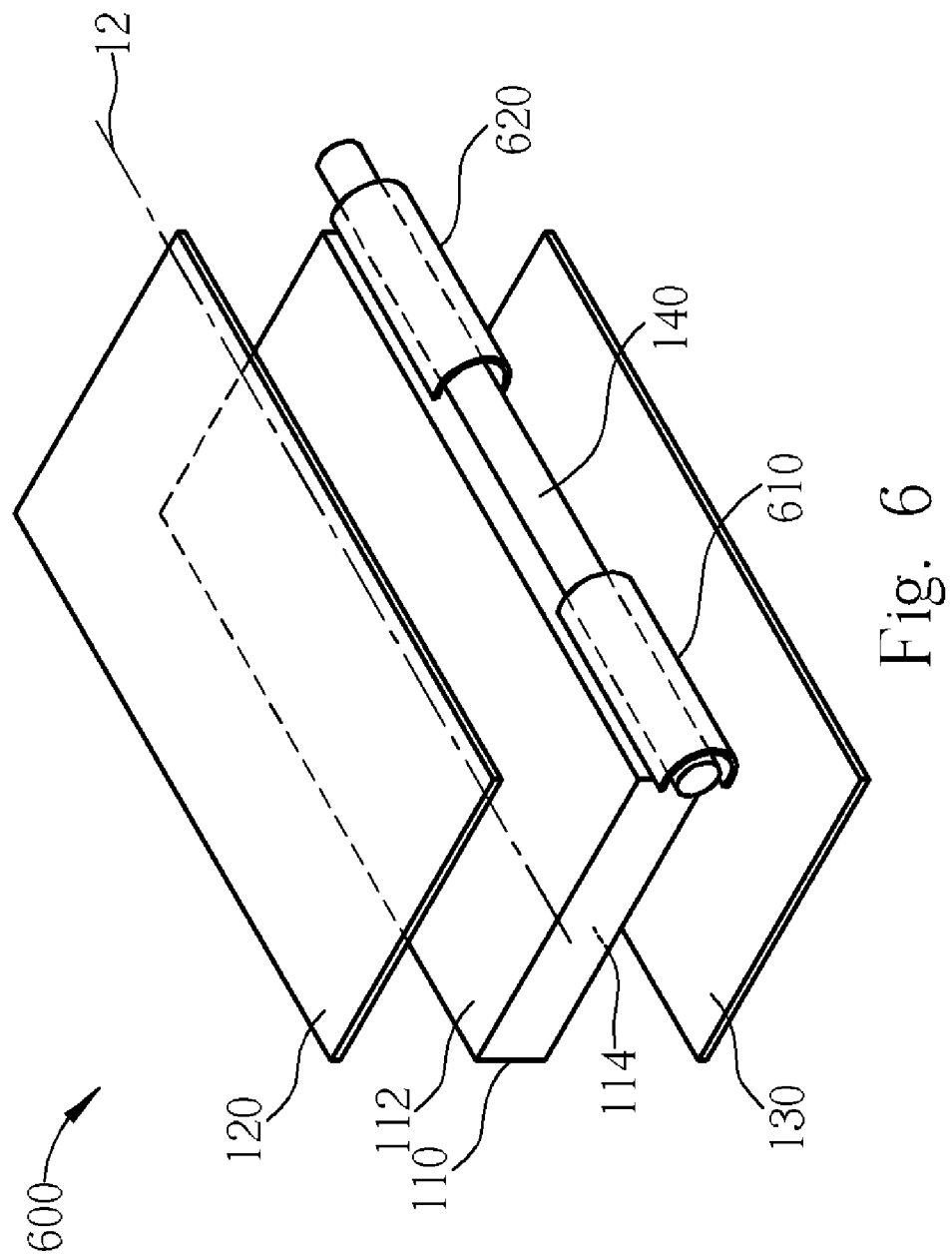

FIG. 5 and FIG. 6 are other embodiments of back light module of the edge lighting type in accordance with the present invention. A back light module 500 shown in FIG. 5 and another back light module 600 shown in FIG. 6 are similar to the back light module 100 described previously. Therefore, components that have the same implementations and operations are labeled the same. The difference among the back light modules 100, 500 and 600 will be explained in below.

As shown in FIG. 5, the back light module 500 further comprises a reflector 510. The reflector 510 is positioned on a side of the light emitting device 140 such that the light emitting device 140 is disposed between the reflector 510 and the LGP 110. The reflector 510 is arranged for reflecting light from the light emitting device 140 to the LGP 110 to improve the light usage efficiency. In this embodiment, the reflectivity of the reflector 510 is not uniform. Instead, the outer portion of the reflector 510 has higher reflectivity than the inner portion of the reflector 510. Accordingly, the outer portion of the reflector 510 has better reflecting performance than the inner portion. In other words, the reflector 510 not only increases the light usage efficiency of the LGP 110 but also exposes the outer portion of the LGP 110 to more light thereby enhancing the luminance of the outer portion of the LGP 110 along the axis 12. Alternatively, the reflecting area of the outer portion of the reflector 510 can be designed to be larger than the reflecting area of the inner portion to reach or enhance the above optical effect.

In the back light module 600, two reflectors 610 and 620 are positioned on a side of the light emitting device 140 such that the light emitting device 140 is disposed between the two reflectors and the LGP 110. As shown in FIG. 6, the two reflectors 610 and 620 are respectively arranged to correspond to the two ends of the light emitting device 140 for reflecting light emitted from the two ends of the light emitting device 140 to the LGP 110. It should be appreciated by those of ordinary skill in the art that the luminance of the outer portion of the LGP 110 can become higher than that of the inner portion thereof due to the configuration of the two reflectors 610 and 620 illustrated in FIG. 6.

Note that, the different optical mechanism designs mentioned above can function independently or co-operate with each other to enhance the optical effect.

The disclosed back light module of the edge lighting type can be utilized as the back light source for various scanners and LCDs. For example, the back light module disclosed in accordance with the present invention can be applied in a scanner capable of scanning transparencies, and positive or negative films. The back light module disclosed in accordance with the present invention will significantly improve the fall off problems of the optical module caused by the optical characteristics or mechanical designs of the optical module.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A back light module of edge lighting type comprising:
   a light guide plate (LGP) for scattering incident light to a light output surface;
   a diffuser positioned on the light output surface of the light guide plate for diffusing light from the light output surface;
   a reflecting layer positioned on a reflection surface of the light guide plate for reflecting light into the light guide plate; and
   a light emitting device for emitting light to at least one side of the light guide plate, the light emitting device comprising a straight cold cathode fluorescent lamp (CCFL) and a plurality of electro luminanecs (ELs) positioned at two ends of the straight cold fluorescent lamp only, wherein the outer portion of the light emitting device along a first axis having higher luminous intensity than the inner portion thereof, the electro luminances correspond to the outer portion, the outer portion includes a first outer portion and a second outer portion both having higher luminance than the inner portion, and the inner portion is between the first outer portion and the second outer portion.

2. The back light module of edge lighting type of claim 1, wherein the outer portion of the diffuser has higher light transmittance than the inner portion of the diffuser.

3. The back light module of edge lighting type of claim 1, wherein the light guide plate has an arc-shape luminance distribution along a second axis.

4. The back light module of edge lighting type of claim 1, wherein a plurality of reflection patterns are formed on the reflection surface of the light guide plate so that the outer portion of the light guide plate has higher luminance than the inner portion of the light guide plate.

5. The back light module of edge lighting type of claim 4, wherein the plurality of reflection patterns is a plurality of reflector dots printed on the reflection surface, and the size or arrangement density of reflector dots of the outer portion of the reflection surface is greater than the size or arrangement density of reflector dots of the inner portion of the reflection surface.

6. The back light module of edge lighting type of claim 4, wherein the plurality of reflection patterns is a plurality of micro-lens.

7. The back light module of edge lighting type of claim 4, wherein the plurality of reflection patterns is a plurality of v-cut grooves.

8. The back light module of edge lighting type of claim 1, further comprising:
   a reflector positioned on a side of the light emitting device such that the light emitting device being disposed between the reflector and the light guide plate, the reflector for reflecting light from the light emitting device to the light guide plate;
   wherein the outer portion of the reflector has higher reflectivity or larger reflecting area than the inner portion of the reflector.

9. The back light module of edge lighting type of claim 1, further comprising:
   two reflectors positioned on a side of the light emitting device with each corresponding to one of two ends of the light emitting device such that the light emitting device being disposed between the two reflectors and the light guide plate, the two reflectors for reflecting light emitted from the two ends of the light emitting device to the light guide plate.

10. A back light module of edge lighting type comprising:
    a light guide elate (LGP) for scattering a incident light to a light output surface;
    a diffuser positioned on the light output surface of the light guide plate for diffusing light from the light output surface:
    a reflecting layer positioned on a reflection surface of the light plate for reflecting light into the light guide plate; and
    a light emitting device for emitting light to at least one side of the light guide plate, the light emitting device comprising a straight cold cathode fluorescent lamp and a plurality of light emitting diodes positioned at two ends of the straight cold cathode fluorescent lamp only;
    wherein the outer portion of the light emitting device along a first axis having higher luminous intensity than the inner portion thereof, the light emitting diodes correspond to the outer portion, the outer portion includes a first outer portion and a second outer portion both having higher luminance than the inner portion, and the inner portion is between the first outer portion and the second outer portion.

11. A back light module of edge lighting type comprising:
    a light emitting device for emitting light;
    a light guide plate (LGP) for scattering light from the light emitting device to a light output surface, wherein a plurality of reflection patterns being formed on a reflection surface of the light guide plate so that the outer portion of the light guide plate has higher luminance than the inner portion of the light guide plate, the outer portion includes a first outer portion and a second outer portion both having higher luminance than the inner and the inner portion is between the first portion and the second portion;
    a diffuser positioned on the light output surface of the light guide plate for diffusing light from the light output surface; and a reflecting layer positioned on the reflection surface of the light guide plate for reflecting light into the light guide plate.

12. The back light module of edge lighting type of claim 11, wherein the outer portion of the diffuser has higher light transmittance than the inner portion of the diffuser.

13. The back light module of edge lighting type of claim 11, wherein the light guide plate has an arc-shaped luminance distribution along an axis.

14. The back light module of edge lighting type of claim 11, wherein the plurality of reflection patterns is a plurality of reflector dots printed on the reflection surface and the size or arrangement density of reflector dots of the outer portion of the reflection surface is greater than the size or arrangement density of reflector dots of the inner portion of the reflection surface.

15. The back light module of edge lighting type of claim 11, wherein the plurality of reflection patterns is a plurality of micro-lens.

16. The back light module of edge lighting type of claim 11, wherein the plurality of reflection patterns is a plurality of v-cut grooves.

17. The back light module of edge lighting type of claim 11, further comprising:
a reflector positioned on a side of the light emitting device such that the light emitting device being disposed between the reflector and the light guide plate, the reflector for reflecting light from the light emitting device to the light guide plate;
wherein the outer portion of the reflector has higher reflectivity or larger reflecting area than the inner portion of the reflector.

18. The back light module of edge lighting type of claim 11, further comprising:
two reflectors positioned on a side of the light emitting device with each corresponding to one of two ends of the light emitting device such that the light emitting device being disposed between the two reflectors and the light guide plate, the two reflectors for reflecting light emitted from the two ends of the light emitting device to the light guide plate.

19. A back light module of edge lighting type comprising:
a light emitting device for emitting light;
a light guide plate (LGP) for scattering light from the light emitting device to a light output surface;
a diffuser positioned on the light output surface of the light guide plate for diffusing light from the light output surface, wherein the outer portion of the diffuser has higher light transmittance. than the inner portion of the diffuser; and
a reflecting layer positioned on a reflection surface of the light guide plate for reflecting light into the light guide plate.

20. The back. light module of edge lighting type of claim 19, further comprising:
a reflector positioned on a side of the light emitting device such that the light emitting device being disposed between the reflector and the light guide plate, the reflector for reflecting light from the light emitting device to the light guide plate;
wherein the outer portion of the reflector has higher reflectivity or larger reflecting area than the inner portion of the reflector.

21. The back light module of edge lighting type of claim 19, further comprising:
two reflectors positioned on a side of the light emitting device with each corresponding to one of two ends of the light emitting device such that the light emitting device being disposed between the two reflectors and the light guide plate, the two reflectors for reflecting light emitted from the two ends of the light emitting device to the light guide plate.

22. A back light module of edge lighting typo comprising:
a light guide plate (LGP) for scattering incident light to a light output surface;
a diffuser positioned on the light output surface of the light guide plate for diffusing light from the light output surface;
a reflecting layer positioned on a reflection surface of the light guide plate for reflecting light into the light guide plate;
a light emitting device for emitting light to the light guide plate; and
a reflector positioned on a side of the light emitting device such that the light emitting device being disposed between the reflector and the light guide plate, the reflector for reflecting light from the light emitting device to the light guide plate;
wherein the outer portion of the reflector includes a first outer portion and a second outer portion both having higher reflectivity or larger reflecting area than the inner portion of the reflector, and the inner portion is between the first outer portion and the second outer portion.

23. A back light module of edge lighting type comprising:
a light guide plate (LGP) for scattering incident light to a light output surface;
a diffuser positioned on the light output surface of the light guide plate for diffusing light from the light output surface;
a reflecting layer positioned on a reflection surface of the light guide plate for reflecting light into the light guide plate;
a light emitting device for emitting light to the light guide plate; and
two reflectors positioned on a side of the light emitting device with each corresponding to one of two ends of the light emitting device such that the light emitting device being disposed between the two reflectors and the light guide p1 ate, the two reflectors for reflecting light emitted from the two ends of the light emitting device to the light guide plate. thereby making a first outer portion and a second outer portion of the light guide plate both have higher luminance than an inner portion of the light guide plate, wherein the inner portion is between the first outer portion and the second outer portion.

24. A back light module of edge lighting type comprising:
a light guide plate (LGP) for scattering incident light to a light output surface;
a diffuser positioned on the light output surface of the light guide plate for diffusing light from the light output surface;
a reflecting layer positioned on a reflection surface of the light guide plate for reflecting light into the light guide plate; and
a light emitting device for emitting light to at least one side of the light guide plate, the light emitting device comprising a plurality of light emitting components being electro luminances (ELs) or light emitting diodes (LEDs) arranged in a straight line, wherein the outer portion of the light emitting device along the straight line having higher light emitting component density than the inner portion thereof.

25. A back light module of edge lighting type comprising:

a light guide plate (LGP) for scattering incident light to a light output surface, wherein the light guide plate has an arc-shape luminance distribution along a second axis;

a diffuser positioned on the light output surface of the light guide plate for diffusing light from the light output surface;

a reflecting layer positioned on a reflection surface of the light guide plate for reflecting light into the light guide plate; and a light emitting device for emitting light to at least one side of the light guide plate, wherein the outer portion of the light emitting device along a first axis having higher luminous intensity than the inner portion thereof.

* * * * *